United States Patent [19]

Tibbs, II

[11] 4,047,577

[45] Sept. 13, 1977

[54] DISCHARGE CONTROLLING PLOW SWEEP

[76] Inventor: Robert C. Tibbs, II, Hospital Drive, Cleveland, Miss. 38732

[21] Appl. No.: 725,422

[22] Filed: Sept. 22, 1976

[51] Int. Cl.² .......................................... A01B 39/20
[52] U.S. Cl. .................................. 172/730; 172/770; 172/771
[58] Field of Search .................. 172/19, 20, 509, 513, 172/371, 377, 381, 721, 722, 723, 724, 730, 733, 770, 771; D8/7; D15/28, 29

[56] References Cited

U.S. PATENT DOCUMENTS

| 63,534 | 4/1867 | Lathrop | 172/733 X |
|---|---|---|---|
| 471,341 | 3/1892 | Harvey | 172/721 X |
| 662,665 | 11/1900 | Bradley | 172/722 X |
| 709,147 | 9/1902 | Fay | 172/730 |
| 1,648,843 | 11/1927 | Francis | 172/730 |
| 2,849,940 | 9/1958 | Haynes | 172/770 |
| D. 33,053 | 8/1900 | Charity | D15/29 |

FOREIGN PATENT DOCUMENTS

| 7,447 | 3/1896 | Sweden | 172/721 |

*Primary Examiner*—Richard T. Stouffer

*Attorney, Agent, or Firm*—Clarence A. O'Brien; Harvey B. Jacobson

[57] ABSTRACT

A plow sweep is provided including a shovel body defining a central front to rear extending axis and having a pair of first and second rearwardly divergent blade arms disposed on opposite sides of the central axis and joined at their forward ends along the axis to define a forward apex of the sweep. The arms are transversely rearwardly and upwardly inclined and the rear portion of the apex includes an integral upwardly directed mounting shank portion. The rear end of at least one of the arms terminates in an oppositely forwardly angulated blade-type wing arm. The forward edges of the arms are sharpened and the latter are also transversely rearwardly and upwardly inclined. The portions of the wing arm or arms and the corresponding blade arms adjacent the juncture thereof have their rear edge portions downwardly depressed into at least generally horizontal front to rear extending positions and the forward end of each wing arm may be provided with an upstanding front to rear extending vane having a forward upstanding edge which is also sharpened.

8 Claims, 8 Drawing Figures

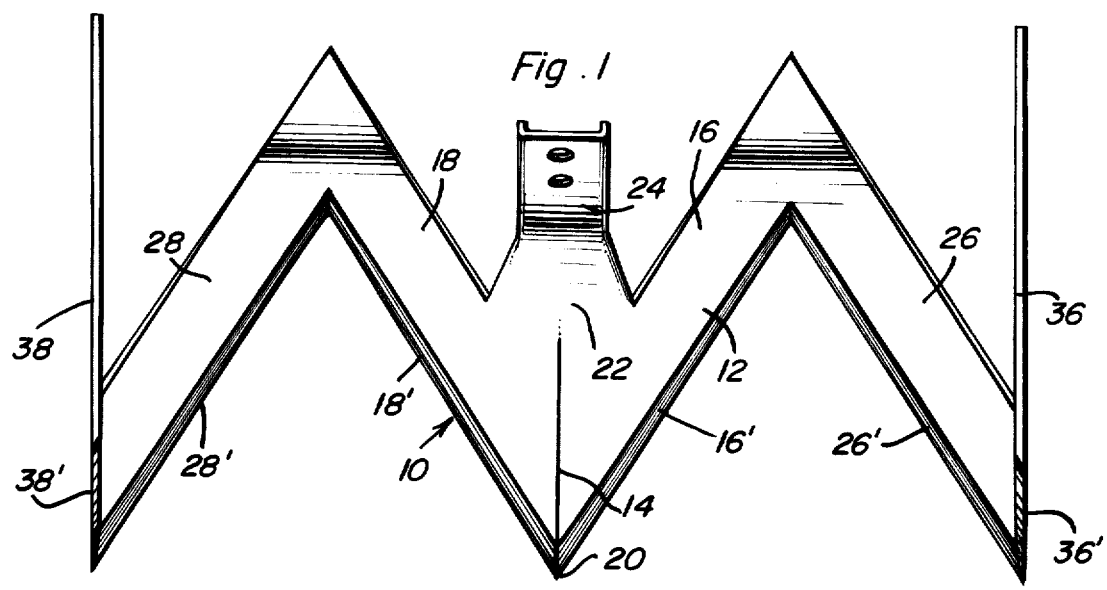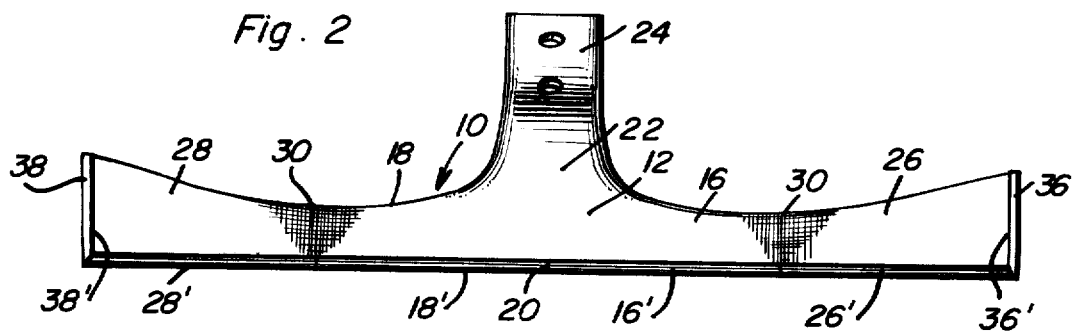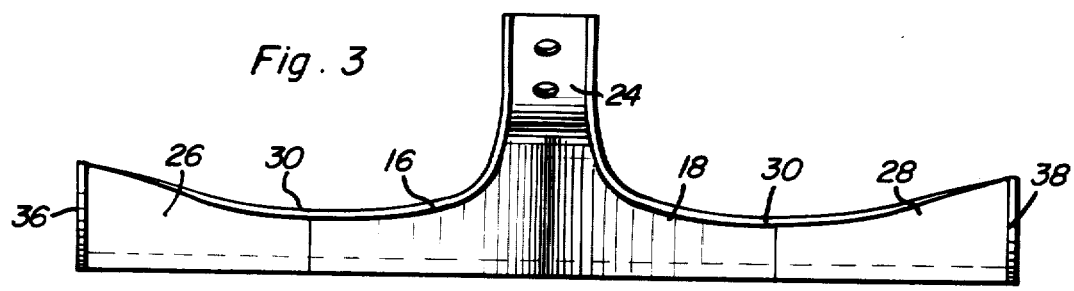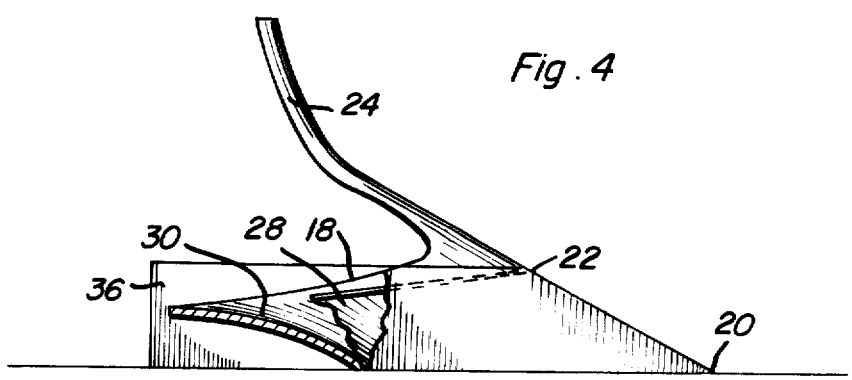

DISCHARGE CONTROLLING PLOW SWEEP

BACKGROUND OF THE INVENTION

When plow sweeps are utilized for cultivation of row crops where herbicide bands have been applied, cultivation of the row crops must be accomplished in a manner which does not disturb the previously applied herbicide bands. In order to achieve such cultivation great care must be taken and such care is sometimes not sufficient to prevent the herbicide bands from being disturbed. Accordingly, a need exists for a plow sweep which may be utilized to advantage for cultivating the areas between row crops and between herbicide bands previously established along the row crops.

Examples of plow sweeps including some of the general structural and operational features of the instant invention are disclosed in U.S. Pat. Nos. 422,718, 709,147, 891,476, 921,578, 2,849,940 and 366,420.

BRIEF DESCRIPTION OF THE INVENTION

The plow sweep of the instant invention is constructed in a manner whereby at least one outer side marginal portion thereof is constructed in a manner to prevent cultivated earth from being deflected outwardly therefrom. In addition, the plow sweep is constructed whereby dirt passing over the blade arms thereof is channeled in a flat stream thereover with little tendency to be flung laterally in either direction.

The main object of this invention is to provide a plow sweep which may be utilized to cultivate areas of ground disposed between adjacent rows of crops and without disturbing herbicide bands previously applied immediately adjacent the row crops.

Another object of this invention, in accordance with the immediately preceding object, is to provide a plow sweep which will be capable of depositing a substantial portion of the ground cultivated thereby in a flat layer behind the plow sweep as a result of the plow sweep being moved forwardly during a cultivating operation.

Still another important object of this invention is to provide a plow sweep which may be readily utilized as a replacement sweep on existing cultivating equipment.

A final object of this invention to be specifically enumerated herein is to provide a plow sweep which will conform to conventional forms of manufacture, be of simple construction and efficient in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of a first form of plow sweep constructed in accordance with the present invention;

FIG. 2 is a front elevational view of the plow sweep illustrated in FIG. 1;

FIG. 3 is a rear elevational view of the plow sweep illustrated in FIGS. 1 and 2;

FIG. 4 is a side elevational view of the plow sweep illustrated in FIGS. 1, 2 and 3 and with adjacent wing portions of the plow sweep being broken away and illustrated in longitudinal vertical section;

DETAILED DESCRIPTION OF THE INVENTION

Figure 5:
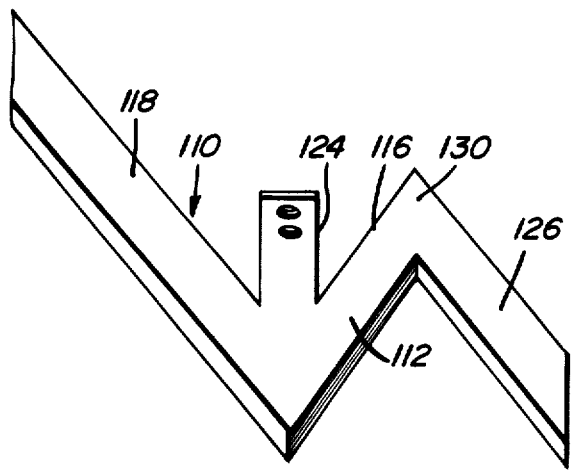
FIG. 5 is a top plan view of a modified form of plow sweep constructed in accordance with the present invention.

Referring now more specifically to the drawings, the numeral 10 generally designates a first form of plow sweep constructed in accordance with the present invention. The plow sweep 10 includes a shovel body 12 defining a central front to rear extending axis 14 and having a pair of first and second rearwardly divergent blade arms 16 and 18 disposed on opposite sides of the center axis 14 and joined at their forward ends along the axis 14 to define a forward apex 20.

The arms 16 and 18 are transversely rearwardly and upwardly inclined and the rear portion 22 of the apex 20 includes an integral upwardly directed mounting shank portion 24.

The rear ends of the arms 16 and 18 terminate in oppositely forwardly angulated blade-type wing arms 26 and 28 which are also transversely rearwardly upwardly inclined and the portions of the blade arms 16 and 18 and the corresponding wing arms 26 and 28 adjacent the junctures thereof have their rear marginal edge portions downwardly depressed into at least generally horizontal front to rear extending portions as at 30, see FIG. 4.

The forward edges of the arms 16, 18, 26 and 28 are sharpened as at 16', 18', 26' and 28' and the forward ends of the wing arms 26 include upstanding trailing vanes 36 and 38 including forwardly and downwardly inclined sharpened forward edges 36' and 38'.

With attention now invited more specifically to FIG. 5 of the drawings there may be seen a first modified form of plow sweep referred to in general by the reference numeral 110. The central portion of the plow sweep 110 is similar to the central portion of the plow sweep 10 and the corresponding components thereof are designated by numerals in the 100 series corresponding to those indentifying the similar components of the central portion of the plow sweep 10. The plow sweep 110 differs from the plow sweep 10 in that the blade arm 118 thereof projects further rearwardly than the blade arm 116 and does not include a forwardly directed wing arm corresponding to the wing arm 28 or the attached vane 38. In addition, the rear end portion of the blade arm 118 does not have its rear marginal edge portion downwardly depressed. In addition, the forward end of the wing arm 126 of the shovel 110 does not include a vane corresponding to the vane 36. However, the adjacent portions of the arms 112 and 126 have their rear edge portions downwardly depressed as at 130.

Figure 6:
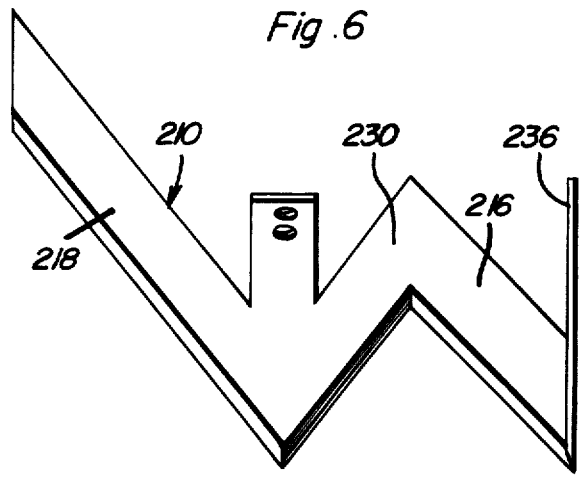
FIGS. 6, 7 and 8 are top plan views of second, third and fourth modified forms of plow sweeps constructed in accordance with the present invention.

With attention now invited more specifically to FIG. 6 of the drawings, there may be seen a second modified form of shovel referred to in general by the reference numeral 210. The shovel 210 is substantially identical to the shovel 110, except that the wing arm 216 thereof corresponding to the wing arm 126 does include an upstanding vane 236 corresponding to the vane 36.

Figure 7:
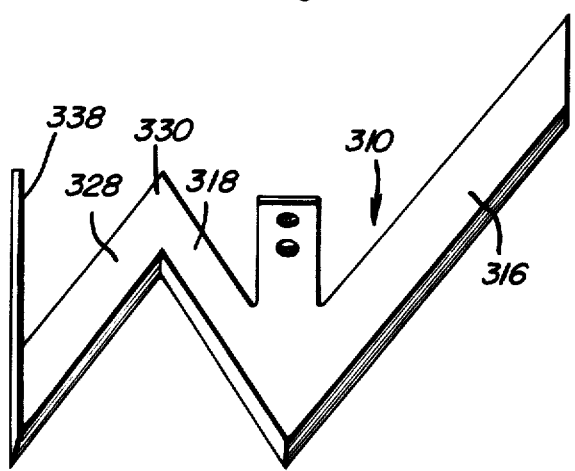

With attention now invited more specifically to FIG. 7 of the drawings, a third modified form of shovel is generally referred to by the reference numeral 310. The shovel 310 is substantially a mirror image of the shovel 210 in that the blade arm 318 thereof includes a forwardly angulated wing arm 328 corresponding to the wing arm 28 and with a vane 338 supported from the forward end of the wing arm 328 corresponding to the vane 38. Accordingly, the shovels 210 and 310 may be considered as right and left hand shovels.

Figure 8:
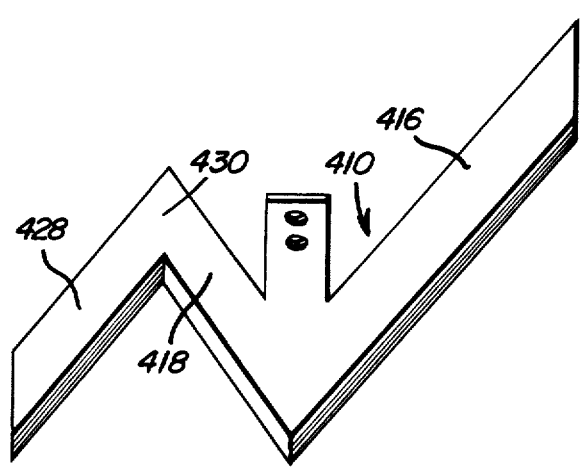

With reference now more specifically to FIG. 8 of the drawings, there may be seen a fourth form of shovel constructed in accordance with the present invention generally referred to by the reference numeral 410. The shovel 410 is very similar to the shovel 110, except that the blade arm 416 thereof comprises the long blade arm and the blade arm 418 thereof includes a forwardly and oppositely angulated wing arm 428. Therefore, the shovels 110 and 410 may be considered right and left hand shovels with neither shovel 110 and 410 including an upstanding vane.

In operation, if the area between closely spaced rows is to be cultivated and the rows have herbicide bands extending therealong, the shovel 10 is utilized. As the shovel 10 cultivates the ground the earth engaged by the forward edges of the arms thereof is deflected toward the downwardly depressed portions 30 over which the earth passes in a flat layer for controlled deposit back down upon the ground. Further, the vanes 36 and 38 prevent any dirt acted upon by the shovel 10 from being deflected outwardly onto the closely adjacent herbicide bands.

On the other hand, if the area between relatively widely spaced rows of crops is to be cultivated, a pair of shovels corresponding to the shovels 210 and 310 may be utilized with the vanes 236 and 338 thereof being disposed closely adjacent the corresponding herbicide bands. In this manner, the blade arms 218 and 316 of the plow sweeps 210 and 310 may laterally outwardly deflect the soil acted thereupon from the free ends thereof without the possibility of cultivated dirt being thrown onto an adjacent herbicide band and the vanes 236 and 338 will prevent the dirt from being directed onto the adjacent herbicide bands.

Finally, if the ground between more widely spaced rows of plants is to be cultivated a pair of shovels such as the shovels 110 and 410 may be utilized, particularly if the shovels are not required to pass closely adjacent the previously applied herbicide bands. The wing arms 126 and 428 of the shovels 110 and 410 will not allow cultivated earth to be deflected outwardly onto adjacent herbicide bands and the wide spacing between adjacent herbicide bands will allow the longer blade arms 118 and 416 to be used without danger of the dirt acted upon thereby being scattered sufficiently laterally outwardly into the adjacent herbicide bands.

It is again pointed out that the depressed portions 30, 130, 230, 330 and 430 of the plow sweeps 10, 110, 210, 310 and 410 enable the dirt acted upon by the adjacent arms to be deposited back on the ground in a smooth even layer of dirt.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A plow sweep including a shovel body defining a central front to rear extending axis and having a pair of first and second rearwardly divergent blade arms disposed on opposite sides of said axis joined at their forward ends along said axis to define a forward apex of said sweep, said arms being transversely rearwardly and upwardly inclined and the rear portion of said apex including an integral upwardly directed mounting shank portion, the rear end of at least one of said arms terminating in an oppositely forwardly angulated blade-type wing arm, the forward edges of said arms being sharpened and said wing arm also being transversely rearwardly and upwardly inclined, the portions of said wing arm and the corresponding blade arm adjacent the juncture thereof having their rear edge portions downwardly depressed into at least generally horizontal front to rear extending positions.

2. The combination of claim 1 wherein the forward end of said wing arm includes an upstanding front to rear extending vane.

3. The combination of claim 1 wherein a first of said blade arms extends further rearwardly from said axis than the other blade arm.

4. The combination of claim 3 wherein said first blade arm comprises the other blade arm.

5. The combination of claim 1 wherein each of said blade arms terminates rearwardly in an oppositely forwardly angulated blade-type wing arm and the forward edge of each wing arm is sharpened.

6. The combination of claim 5 wherein the portions of each wing arm and the corresponding blade arm have their rear edge portions downwardly depressed into a least generally horizontal front to rear extending portions.

7. The combination of claim 6 wherein the forward end of at least one said wing arms includes an upstanding front to rear extending vane.

8. The combination of claim 6 wherein the forward end of each of said wing arms includes an upstanding front to rear extending vane.

* * * * *